US009693062B2

(12) United States Patent
Hughes (10) Patent No.: US 9,693,062 B2
(45) Date of Patent: Jun. 27, 2017

(54) APPARATUS AND METHOD OF TEXTURE ENCODING AND DECODING (71) Applicant: Sony Computer Entertainment Europe Limited, London (GB)

(72) Inventor: Colin Jonathan Hughes, London (GB)

(73) Assignee: Sony Interactive Entertainment Inc. (JP)

(*) Notice: Subject to any disclaimer, the term of this patent is extended or adjusted under 35 U.S.C. 154(b) by 155 days.

(21) Appl. No.: 14/589,374

(22) Filed: Jan. 5, 2015

(65) Prior Publication Data
US 2015/0195541 A1 Jul. 9, 2015

(30) Foreign Application Priority Data

Jan. 6, 2014 (GB) .................................. 1400140.8

(51) Int. Cl.
*H04N 7/12* (2006.01)
*H04N 11/02* (2006.01)
(Continued)

(52) U.S. Cl.
CPC ......... *H04N 19/136* (2014.11); *H04N 19/119* (2014.11); *H04N 19/146* (2014.11);
(Continued)

(58) Field of Classification Search
CPC ........................... H04N 19/105; H04N 19/114
(Continued)

(56) References Cited

U.S. PATENT DOCUMENTS 5,809,176 A * 9/1998 Yajima ................ H03M 7/4006
375/E7.026
6,154,216 A * 11/2000 Walton .................... G06T 15/04
345/555
(Continued)

FOREIGN PATENT DOCUMENTS

| EP | 1143736 A2 | 10/2001 |
|---|---|---|
| EP | 2611156 A1 | 7/2013 |
| WO | 2007015047 A2 | 2/2007 |

OTHER PUBLICATIONS

Budagavi Madhukar et al: "Intra motion compensation and entropy coding improvements for HEVC screen content coding", 2013 Picture Coding Symposium (PCS), IEEE, Dec. 8, 2013 (Dec. 8, 2013), pp. 365-368, XP032567034.
(Continued)

*Primary Examiner* — Dominic D Saltarelli
(74) *Attorney, Agent, or Firm* — Lerner, David, Littenberg, Krumholz & Mentlik, LLP (57) ABSTRACT

A method of texture encoding is provided. The method includes obtaining a plurality of textures, assembling a sequence of textures by selecting a first texture of the sequence of textures and then, one or more times, adding to the sequence of textures a texture from the plurality of textures that is calculated to be the one most similar to the current last texture in the sequence of textures. The method then encodes the assembled sequence of textures using a motion vector based video encoding scheme. Meanwhile, a method of texture decoding includes receiving a data file encoded using a motion vector based video encoding scheme, decoding the data file using a corresponding motion vector based video decoding scheme, and obtaining from the decoding scheme a sequence of textures arranged in an order of mutual similarity.

14 Claims, 6 Drawing Sheets

(51) Int. Cl.
  *H04N 11/04* (2006.01)
  *H04N 19/136* (2014.01)
  *H04N 19/119* (2014.01)
  *H04N 19/51* (2014.01)
  *H04N 19/146* (2014.01)
  *H04N 19/17* (2014.01)
  *H04N 19/192* (2014.01)
  *H04N 19/436* (2014.01)
  *H04N 19/88* (2014.01)
  *H04N 19/44* (2014.01)

(52) U.S. Cl.
  CPC ........... *H04N 19/17* (2014.11); *H04N 19/192* (2014.11); *H04N 19/436* (2014.11); *H04N 19/44* (2014.11); *H04N 19/51* (2014.11); *H04N 19/88* (2014.11)

(58) Field of Classification Search
  USPC .................................................. 375/240–241
  See application file for complete search history.

(56) References Cited

U.S. PATENT DOCUMENTS

| 2003/0076334 | A1  | 4/2003  | Dumitras et al. |
| 2008/0043840 | A1* | 2/2008  | Song .................... H04N 19/593 375/240.11 |
| 2009/0003693 | A1  | 1/2009  | Yamamoto |
| 2012/0281925 | A1  | 11/2012 | Nystad et al. |

OTHER PUBLICATIONS

Extended European Search Report for Application No. 14190093.6 dated Jun. 2, 2015.

Jana Zujovic: "Structure Similarity Metrics for Texture Analysis and Retrieval", Dec. 1, 2008 (Dec. 1, 2008), XP002739948, Retrieved from the Internet: URL:http://users.eecs.northwestern.eduj-jzu850jpapers bib/zujovic08thesis.pdf.

Combined Search and Examination Report for Application No. GB 1400140.8 dated Jun. 30, 2014.

Official Letter dated Sep. 30, 2016 for EP Application No. 190093.6.

* cited by examiner

APPARATUS AND METHOD OF TEXTURE ENCODING AND DECODING

CROSS REFERENCE TO RELATED APPLICATIONS

The present application claims the benefit of and priority to GB Application No. 1400140.8, filed Jan. 6, 2014, the entire disclosure of which is incorporated by reference herein.

BACKGROUND OF THE INVENTION

Field of the Invention

The present invention relates to an apparatus and method of texture encoding and decoding.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Textures are images (for example, bitmaps) that are applied to geometric surfaces in videogames and other computer graphics applications. In the case of videogames, a typical level or region of an in-game environment may have hundreds of textures associated with it, providing the imagery for each individual object and element of the environment.

As a consequence, loading textures into memory becomes an appreciable component of the loading time for a videogame, and it is desirable to reduce this.

One solution is to compress the textures; for example by compressing bitmaps to a format with lower redundancy, so converting some of the overhead in terms of storage into overhead in terms of processing needed to subsequently decompress and use the textures.

It is desirable therefore to obtain good compression in return for the effective cost of increased decompression processing, or conversely to reduce the decompression overhead for a given level of compression, particularly for portable devices where a processing overhead leads to a reduction in battery life.

The present invention seeks to address or mitigate this need.

SUMMARY OF THE INVENTION

In a first aspect, a method of texture encoding is provided in accordance with claim 1.

In another aspect, a method of texture decoding is provided in accordance with claim 10.

In another aspect, a method of texture decoding is provided in accordance with claim 11.

In another aspect, an encoding apparatus is provided in accordance with claim 13.

In another aspect, a decoding apparatus is provided in accordance with claim 14.

Further respective aspects and features of the invention are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An apparatus and method of texture encoding and decoding are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

System Overview

Figure 1:
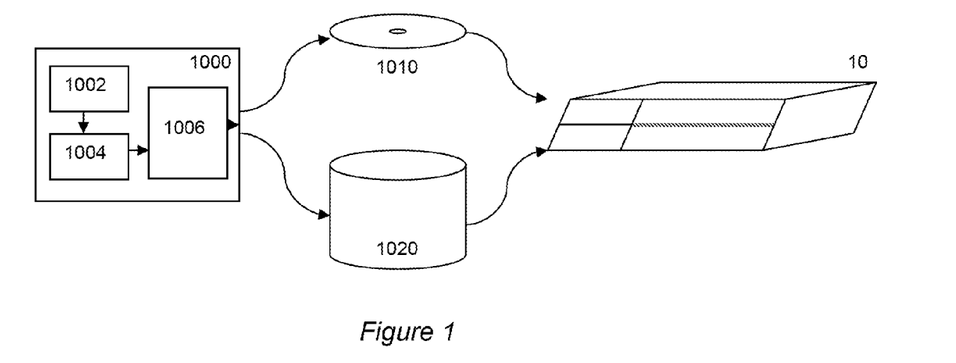
FIG. 1 is a schematic diagram of an encoding, transport and decoding system in accordance with an embodiment of the present invention.

Referring to FIG. 1, in an embodiment of the present invention, a content authoring device 1000 such as a videogame development kit, or a computer used to output textures for a videogame, generates encoded textures for storage on physical media 1010 such as Blu-Ray® game disks, or on a server 1020. The textures are then decoded by an entertainment device 10 that either receives the physical media or downloads the textures over the internet from the server.

As noted previously, it is desirable to improve the compression of the textures, so as to either allow more textures to be included on a disk, or to reduce download times. At the same time, it is desirable to simplify the decoding process for the entertainment device where possible.

Figure 2:
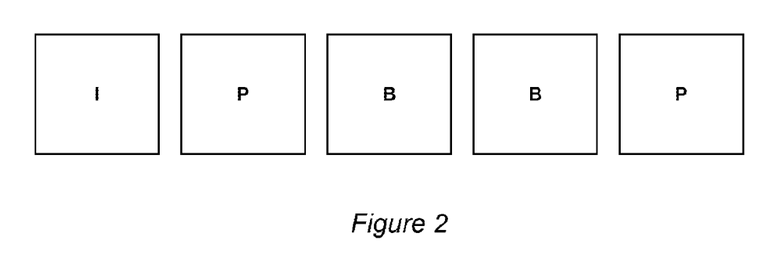
FIG. 2 is a schematic diagram of MPEG encoded video frame types.

Referring now to FIG. 2, in an embodiment of the present invention it is proposed to use MPEG (for example, MPEG 2 or MPEG 4) as a compression mechanism. The advantage of this approach is firstly that, in principle, MPEG is capable of high compression ratios, and secondly that many chipsets for entertainment devices now include dedicated hardware designed to perform MPEG decoding, making the decoding process fast and power efficient.

The MPEG encoding scheme is based upon a sequence of frames in which so-called motion vectors are used to indicate how to construct each frame from elements of preceding (or following) frames. In this scheme, so called I-frames (intra-coded frames) are self-contained DCT encoded images similar to JPEGs, and form the starting point of a so-called group of pictures (GOP). Meanwhile, so-called P-frames (interframe predictive coding frames) use a preceding image to predict the current image based upon motion vectors that indicate how elements (macroblocks) of the preceding image could be rearranged to best fit as elements of the current image; then just the difference between the prediction and the actual current image are DCT encoded. In this way, a P-frame can be used to reconstruct the current image using the preceding image, the motion vectors and the difference data. Finally so-called B-frames (interframe interpolative coding frames) use forward and reverse prediction (i.e. motion vectors from preceding and following images) on a per-macroblock basis; this doubles the source of potential good matches to macroblocks of the current image and so potentially reduces the size of the difference that needs to be encoded, so improving compression, but does so at the cost of enforcing at least a one frame delay in the decoding process in order to obtain receive and decode the following image first.

It will be appreciated therefore that MPEG's compression scheme (and hence the desirable high compression ratio) is based upon the assumption that successive source images in a video sequence are similar enough to each other to approximate each other well, using just a local rearrangement of macroblocks as specified by motion vectors.

Texture Sorting

Figure 3A:
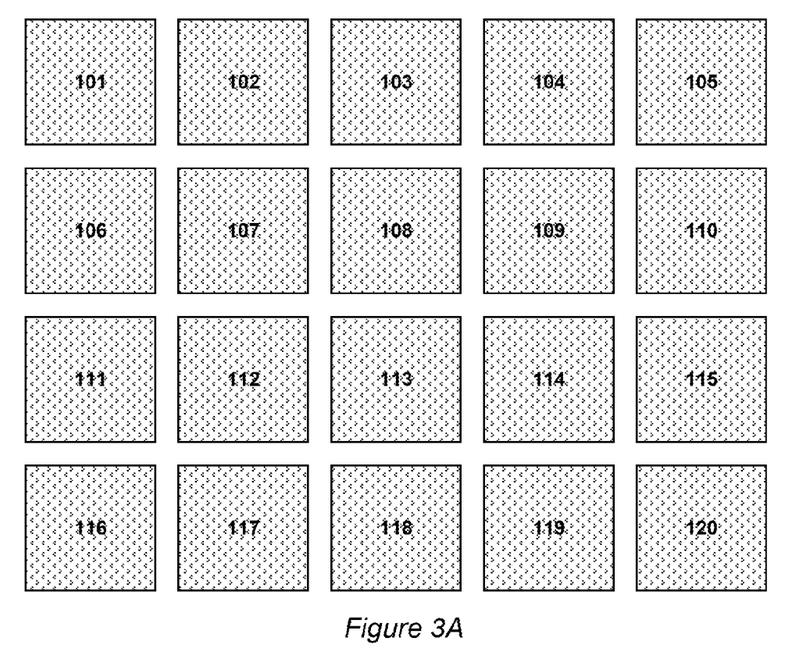
FIGS. 3A and 3B are schematic diagrams of an initial set of textures and a sorted set of textures, respectively, in accordance with an embodiment of the present invention.

Referring now to FIG. 3A, this shows an arbitrary, non-limiting set of textures (101-120) for a video game. The actual textures are not shown for clarity—hence all the textures look identical in the Figure.

However, it will be appreciated that the textures may respectively depict trees, brickwork, sand, grass, road, foliage, several different player characters, and so on, all relating to a level of a videogame.

Consequently they are prima facie unsuited to MPEG compression, because unlike the succession of frames in a video sequence, each texture (101-120) is an arbitrary, stand-alone image.

However, in an embodiment of the present invention, these textures are sorted into a sequence in which neighbouring textures in the sequence are close (or the closest) matches to each other, according to some metric.

Using this approach, the sorted textures can better predict each other using the local rearrangement of macroblocks by motion vectors as per MPEG encoding sufficiently well for MPEG encoding to provide a net benefit over alternative compression methods. This advantageously allows use of MPEG encoding efficiency and also MPEG decoding hardware at the receiving device.

The sorting metric can be any of the following, or a combination thereof as explained below.

To a first approximation, textures are compared on the basis of colour. Typically textures are represented in the YCbCr colour space, but any suitable colour space can be envisaged. The average colour of a complete texture can thus be calculated, and the textures can be sorted according to the relative position of their average colour along the colour spectrum. This first approximation has an advantage that the sorting is relative to an absolute measure (a color spectrum) and so the computational load is proportional to the number of textures, rather than proportional to a number of combinations of textures as may occur when textures are compared to each other.

To a second approximation, the per-macroblock average distance in colour space between corresponding macroblocks in two textures can be evaluated, and these average distances can be aggregated to determine an overall aggregate distance measure between a first and second texture. Subsequently if a third texture is found to have a closer overall aggregate distance measure to the second texture than the first, then it is placed after the second texture in a sequence. Conversely, if the third texture is found to have a closer overall aggregate distance measure to the first texture than the second, then it is placed before the first texture in the sequence. Finally, if it is found to have a closer overall aggregate distance measure to the first texture and the second than the first and second textures do to each other themselves, then it is placed between the first and second textures in the sequence.

To reduce the computational overhead of this sorting process, the first approximation can be used first to generate a first sequence, and then the second approximation can be used to generate a refined second sequence, limiting the number of neighbouring textures to compare with a current texture in the first sequence to ±N, where N allows a trade-off between potential accuracy in the sequence and computing resource.

To a third approximation, cross correlation between two textures may be used to generate a correlation score. Advantageously, cross correlation of images incorporates an evaluation of spatial offset and hence a correlation score will also capture some indication of the suitability of a pair of textures to the motion vector prediction scheme used by MPEG. Having arranged two textures in a sequence, a third may be evaluated and positioned in a manner analogous to that recited in the second approximation above. That is to say, if a third texture is found to be more closely correlated to the second texture than the first, then it is placed after the second texture in the sequence. Conversely, if the third texture is found to be more closely correlated to the first texture than the second, then it is placed before the first texture in the sequence. Finally, if it is found to have a closer correlation to both the first texture and the second than the first and second textures do to each other themselves, then it is placed between the first and second textures in the sequence.

Again, to reduce the computational overhead of this process, the search space for selecting textures can be restricted by first arranging the textures using the first approximation and/or the second approximation above. Then the third approximation may be used to generate a refined new sequence, limiting the number of neighbouring textures to compare with a current texture in the current sequence to ±M, where M allows a trade-off between potential accuracy in the sequence and computing resource.

Finally, to a fourth approximation, a test MPEG encoding can be performed on a pair or triple (or more) of textures. MPEG encoding itself is described in more detail later herein, but for the purposes of understanding, a test encoding is performed and the prediction error for one or more of the textures is recorded. Different combinations of two or three (or more) textures can be tested in this way, with combinations resulting lower prediction errors being retained.

Where the pairs, triples (or more) are assembled texture-by-texture, the prediction error for the additional texture is used to determine retention. Where the pairs, triples (or more) are assembled as a group, then the prediction errors within this sequence are combined for use in determining retention.

The retained combinations can then be added to by fixing the existing sequence and seeking the next best texture to add.

It will be appreciated that the number of combinations of textures to search through may create a high computational load. Consequently, any of the first, second and/or third approximations of a texture sequence may be used beforehand. The test MPEG encoding may then be used to generate a refined new sequence, limiting the number of neighbouring textures to test with a current portion of the sequence to ±P, where P allows a trade-off between potential accuracy in the sequence and computing resource.

Hence, more generally, the first, second, third and fourth approximations can be generalised as methods of texture sorting to reduce the entropy in a sequence of textures—i.e. to reduce the disorder in the sequence, so increasing the rate of feature correspondence between successive textures so that they better approximate the continuity of features in adjacent frames of a conventional video. Put another way, they are methods of texture sorting to increase on average the accuracy of prediction by one texture of its neighbour in a sequence when encoded using the MPEG encoding scheme. The methods are based either on global colour properties (first approximation), local colour properties (second approximation), image element cross correlation (third approximation), or MPEG prediction error (fourth approximation).

Figure 3B:
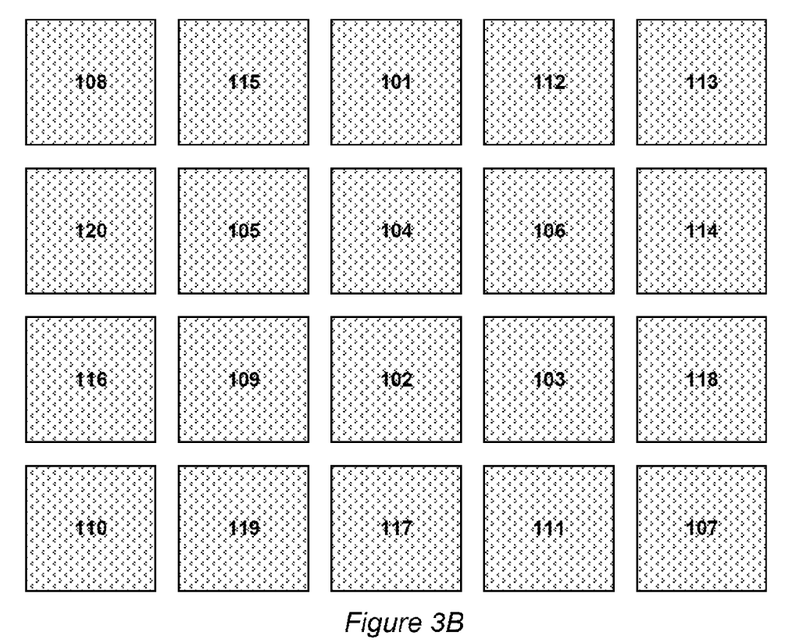

Referring to FIG. 3B, after sorting the result is a new sequence of textures having a reduced level of entropy compared to the original sequence in FIG. 3A.

Variant Sorting Methods

As a first variant sorting method, alternatively or in addition to incrementally sorting the texture sequence using more accurate but more complex metrics (the first to fourth approximations above), the computational overhead of sorting the textures may be reduced by reducing the combinatorial effect of sorting potentially hundreds of textures. This reduction may be achieved by sorting textures into short sequences, and then sorting short sequences into longer sequences, and so on.

Hence for example, after optionally pre-sorting the textures into a rough sequence using the first approximation, then the second, third and/or fourth approximations may be used to generate short sequences of two, three or four textures (for example) based on local searches of the rough sequence (e.g. ±N, M or P as appropriate).

These short sequences can then be treated as units for a repeat sorting process, based upon the textures at the endpoints of each short sequence, to generate longer sequences of two, three or four short sequences (for example).

This process can continue until the whole set of textures is sequenced.

In this way, either the individual sequences to assemble are shorter than a full sequence, and/or the number of objects to search through is smaller than the number of textures because they are already partial sequences, and so the number of combinations to explore is smaller than if a single complete sequence was to be assembled from the individual textures themselves. Whilst it will be appreciated that the outcome may not be as good (as near to optimal) as a sort based upon a brute-force search of all combinations of textures, or even as good as a re-sort based upon a subset of ±N, M or P textures within a pre-sorted list of all textures, it will still serve to reduce the entropy of the sequence of textures well enough that MPEG compression provides a net benefit.

Hence, more generally, the first variant breaks the sequencing task into plural sub-tasks, each creating a short sequence, and then applies this approach recursively to build progressively longer sequences.

As a second variant sorting method, in addition to incrementally sorting the texture sequence, and indeed alternatively or in addition to the first variant, the textures may be pre-processed as follows.

MPEG relies upon a sequential or temporal correspondence between frames to provide good compression. However, often textures have strong spatial repetition, as may be appreciated from the 'brick', 'grass' and other texture examples mentioned above. Hence optionally large textures may be broken down into smaller textures (for example, 1024×1024 pixel textures may be broken down into 512×512 or even 256×256 sub-textures). As a result any spatial repetition in one large texture now potentially also becomes a sequential or temporal repetition between those sub-textures. As a result the MPEG compression ratio for the overall texture is likely to be increased, and will possibly be higher than if the full texture was compressed in sequence with another full texture; now only a subset of the two different textures form an interface within the sub texture sequence, limiting the size of the resulting prediction error to encode to that of one sub-texture. In principle, sub-textures can also be sorted so that even lower entropy can be achieved. This sorting may be restricted to within the overall texture group, or could be constrained to within neighbouring textures, or could be unconstrained.

Hence more generally, the second variant divides each (sorted) texture into an ordered set of sub-textures, which may or may not then be sorted themselves, either within their own set or within a super-set comprising the sub-textures of the neighbouring textures, or even more (e.g. ±N, M or P textures).

A possible disadvantage of this second variant approach is that the sub-textures have to be reassembled after decoding. If the sub-textures themselves are not resorted then this is a reasonably straightforward process. However if sorting of sub-textures is allowed, then some sequence metadata will be required to reconstruct the texture.

Finally, it will be appreciated that where there are textures of different sizes, then a respective MPEG stream can be created for each texture size.

Modified MPEG Compression

Figure 4A:
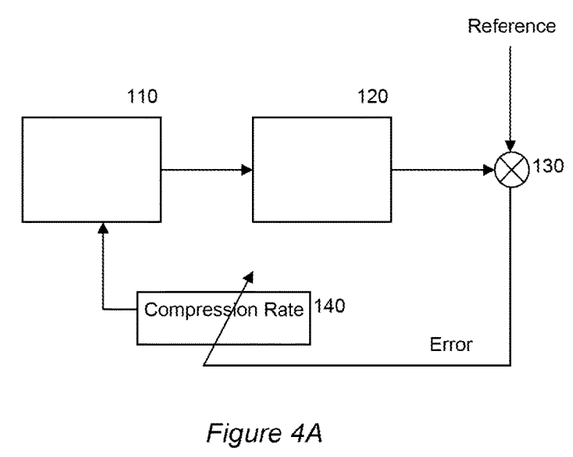
FIG. 4A is a schematic diagram of an MPEG encoding system.

Referring to FIG. 4A, a conventional MPEG encoding system comprises an MPEG encoder 110, an MPEG decoder 120, a comparator 130 and a compression rate (bit rate) controller 140.

The system then takes a source image in a sequence and encodes it as an I, P or B frame according to the MPEG scheme at a given compression rate, and then decodes it again. The decoded image is then compared with the source image to determine the error (i.e. the loss of fidelity) in the decoded image. The error (for example, a sum-squared difference value, though more sophisticated measurements are possible) is then fed back to the compression rate controller to adjust the compression rate and re-try the process if necessary.

This system is then typically set a target bitrate and/or a target quality metric. The target bitrate guides the compression rate. The target quality guides the acceptable error level.

The MPEG encoding system then attempts to either achieve the best quality for the target bitrate, or minimise the actual bitrate for the target quality. Where both bitrate and quality targets are given, then an MPEG encoder will typically give precedence to the target bitrate; that is to say, if the target quality cannot be achieved within the target bitrate, then the target bit rate typically cannot be increased to allow the target quality to be met.

This is often a particular issue for real-time MPEG streaming, where a guaranteed video frame rate is required and hence a bit-rate that can provide a frame in the current channel conditions effectively sets an upper bound on encoding.

However for applications envisaged by the present invention this is less likely to be an issue, due to the relatively high capacity of optical media, and the non-real-time nature of game downloads. Rather, the quality of the graphics textures is more important. Hence typically the MPEG encoding will give precedence to the target quality, even if the resulting bitrate ends up being relatively high when compared to real-time streaming applications.

However, in an embodiment of the present invention, optionally the MPEG encoding system is adapted to take account of the atypical subject matter being encoded; typically in videogames, textures are themselves encoded and decoded using one of the so-called DXT compression schemes (a form of block truncation coding), which are often used when loading textures into video memory. Typically such a scheme breaks a texture down into 4×4 pixels, and generates a 4 colour palette for these pixels that lies on a straight line through colour space, so that two of the four colours can be interpolated along the line from the two colours at the end-points of the line.

Hence given colour #1 and colour #4, then colour #2 is $\frac{2}{3}$ colour #1 and $\frac{1}{3}$ colour #4, whilst colour #3 is $\frac{2}{3}$ colour #4 and $\frac{1}{3}$ colour #1. The 4×4 pixels of the texture are then respectively mapped to the closest of these four colours and then encoded as an index of colours 1-4 and representations of colours #1 and #4.

Notably therefore the data size of textures compressed using this scheme is constant for a given texture resolution, whilst the quality varies depending on the original colour palette of the textures within each 4×4 block. In particular, DXT schemes work reasonably well for colour gradients within textures, but less well for heterogeneous colour regions. As a result, DXT compression has a varying effect on texture quality depending on nature of the original texture.

Figure 4B:
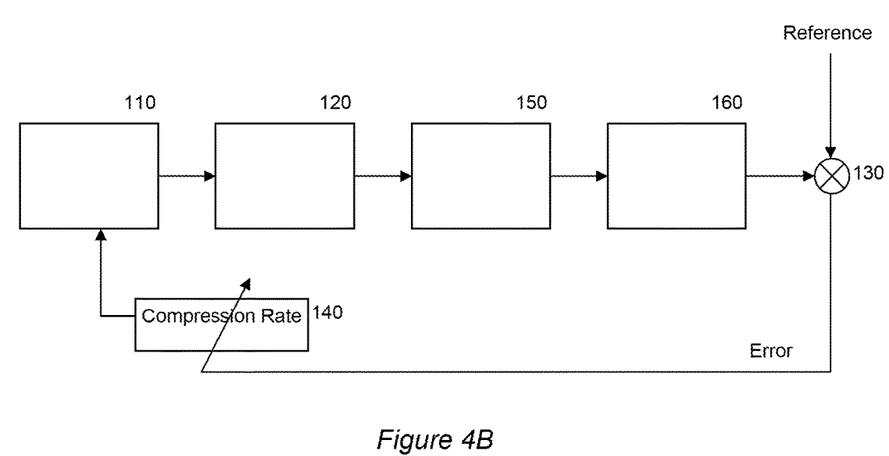
FIG. 4B is a schematic diagram of an adapted MPEG encoding system in accordance with an embodiment of the present invention.

Hence in an embodiment of the present invention, referring now to FIG. 4B, the MPEG encoding system incorporates a DXT encoder 150 and decoder 160 into the evaluation cycle.

Now the error generated by the comparator with reference to the source image is based upon both the lossy compression of MPEG and also the lossy compression of DXT.

As a result, the MPEG quality metric can be adaptively set as being equal to that of DXT for the current image. That is to say, the MPEG compression can be set so that the error in the decoded image is predominantly due to the DXT compression; stated another way, the MPEG compression can be set so that the image noise due to the DXT compression substantially masks the image noise due to the MPEG compression.

In practice therefore, the system can start with a predetermined MPEG compression rate, obtain an error that at least in part is due to the DXT compression, and then increase the MPEG compression rate and test again. If the error does not increase by a value commensurate with the increase in the MPEG compression rate then this means that the error is still dominated by the DXT compression, and so the MPEG compression rate can be increased again. This can continue until the error does increase by a value commensurate with the increase in the MPEG compression rate. At this point, the preceding MPEG compression rate (i.e. prior to MPEG compression having a dominant effect on quality) can be chosen.

Clearly, if increasing the MPEG compression rate above the predetermined MPEG compression rate immediately causes an increase in the error commensurate with the increase the MPEG compression rate, this implies that the predetermined MPEG compression rate is too high and so the MPEG compression rate can instead be incrementally decreased in a similar manner until the decrease in error is no longer commensurate with the decrease in MPEG compression rate, at which point either the current or preceding MPEG compression rate can be chosen.

In this way, the best MPEG compression rate can be chosen that has little or no substantive effect on the quality of an equivalent DXT compressed texture.

This adapted MPEG encoding system can optionally be used in generating the fourth approximation of the ideal texture sequence described previously herein.

This adapted MPEG encoding system can also of course optionally be used to generate a final output texture MPEG stream to storage on an optical disc or network server.

Decompression in Hardware

Figure 5:
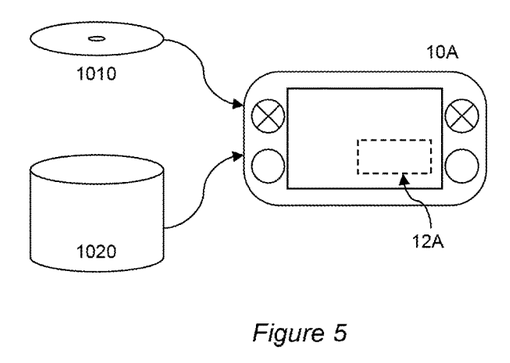
FIG. 5 is a schematic diagram of data delivery mechanisms and a recipient entertainment device comprising a decoding system in accordance with an embodiment of the present invention.

Referring now to FIG. 5A, a portable entertainment device 10A such as the Sony® PlayStation® Vita®, or similarly smartphone, PDA and laptop devices, which comprise dedicated video decoding hardware 12A, can then decode the mpeg stream associated with a particular game level to quickly obtain the textures encoded therein using power-efficient dedicated hardware, rather than the CPU.

Clearly for some variants described above the CPU may then perform additional actions such as reassembling subtextures. In addition, the low-entropy order of the textures may not be optimal as a read-order for the textures within the game, and so the CPU may utilise a look-up table and general RAM to buffer some or all of the obtained textures, and then send them to video memory in a different order that is more efficient for reading when drawing the graphics.

Parallel Decompression

By contrast, referring back to FIG. 1, an entertainment device 10 such as the Playstation 4 ® will typically comprise a powerful graphics processing unit that, in principle, could decompress the mpeg stream more quickly than dedicated hardware, because it has parallel processes (in the case of the Playstation 4, a total of 18 compute units made up of 1152 shader processors).

Hence, for example at encoding, the MPEG stream could be broken into 18 successive GOPs (groups-of-pictures) each starting with an I-frame, and these could be decompressed in parallel using the compute units of the graphics processing unit.

Optionally, the MPEG stream can be broken into GOPs based upon a property of the sorted texture sequence, so as to reduce the effective bandwidth overhead of the I-frames needed in the stream, as these are the least compressed frames. In this case, the texture sequence is sorted so that any occurrences of large differences between textures are distributed fairly evenly within the sequence.

This arrangement may naturally arise when using the first variant sorting method; the short sequences are generated to reduce the entropy of their own short texture sequence, but then present a smaller selection of textures to sequence when assembling a longer sequence (i.e. just the short sequence end points). Hence as sequences are interactively combined and get longer, the number of choices for the best matching end-points becomes small, and so the likelihood of large differences between the endpoints of sequences gets greater.

Figure 6:
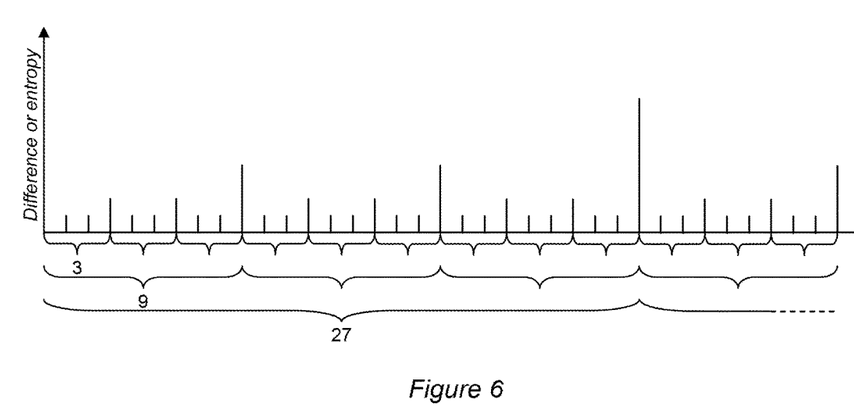
FIG. 6 is a schematic diagram of difference or entropy values between adjacent textures in a texture sorting scheme in accordance with an embodiment of the present invention.

Hence referring to FIG. 6, here (purely by way of example) the full set of individual textures are initial sorted into triples 3, each having relatively low entropy in the arbitrary scale shown. Then the reduced set of triples are sorted into nines 9. Because the number of possible matches between textures has now been reduced (by a factor of three), on average the difference or entropy between triples will be higher. Then the further reduced of nines are sorted into twenty-sevens 27. Because the number of possible matches between textures has now been reduced again set (by another factor of three), on average the difference or entropy between nines will be higher still. Finally, matches between sequences of twenty-sevens are likely to have a higher entropy still, and so-on until the full sequence is assembled.

The encoder can then detect, for example, 18 pairs of textures that create the highest such differences in the final sequence (or the highest difference within a section of the stream, so as to guarantee a roughly even distribution of such detected textures). The second of each of these pairs of textures may then be encoded as I frames, so that the relative additional cost of the I-frame is low relative to P-frame or B-frame encoding of the same texture, because the prediction error for that frame would be higher than average for the sequence anyway.

Alternatively, the MPEG stream can be defined as a single GOP, and these textures may be encoded as P-frames with respect to the first I frame in the stream.

Returning to the decoder, in the first instance in which I-frames are still present within the stream, then the respectively formed GOPs can be apportioned to the parallel compute units as before.

However, in the second instance, where the I-frames are encoded as P-frames, these may be identified using metadata associated with the MPEG stream, and the respective sub-stream starting with each of these P-frames can be apportioned to its own a parallel compute unit. The P-frames can all then be decoded with reference to the original I-frame, and then the remainder of the decoding process proceeds as before.

This parallel processing can be improved further if the sequence of P and B frame encoding in each GOP or sub-stream is the same, so that the shaders are loading the same processes at the same time.

Hence using the above techniques, an efficient encoding of video game textures can be achieved using MPEG 2 or 4 (or, indeed, any motion vector based video encoding scheme). The encoded textures can then be decoded using dedicated video decoding hardware, or decoded in parallel using a general video graphics card with parallel compute units.

Figure 7:
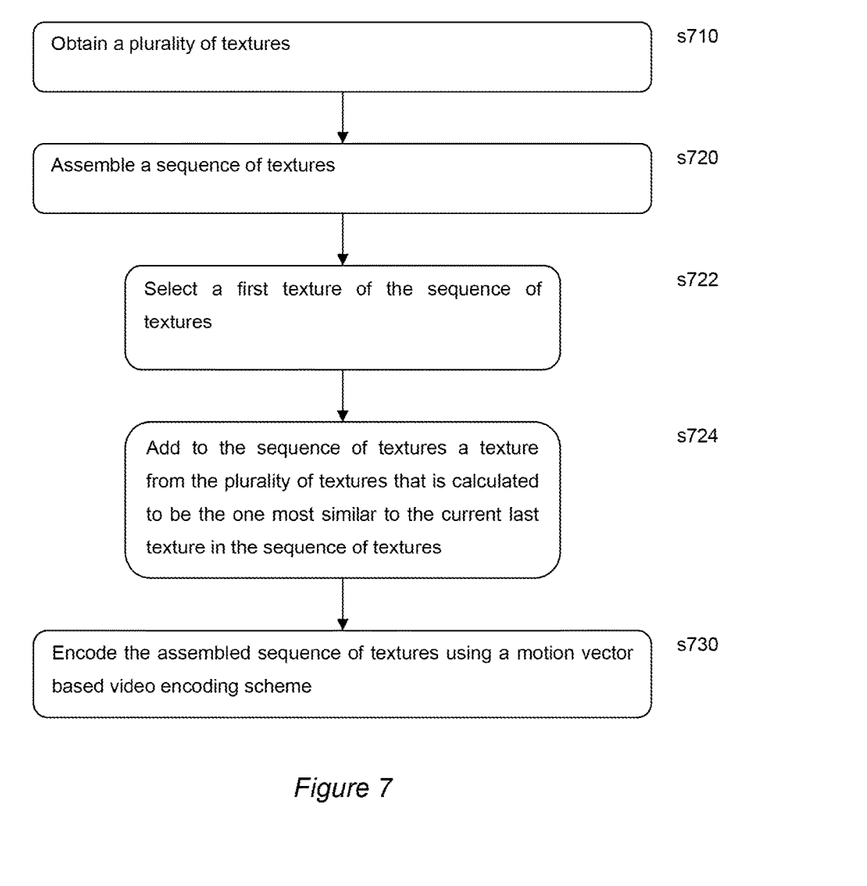
FIG. 7 is a flow diagram of a method of texture encoding in accordance with an embodiment of the present invention.

Hence, in a summary embodiment of the present invention, and referring to FIG. 7, as described previously herein a method of texture encoding comprises;

In a first step s710, obtaining a plurality of textures (for example from an art application, or a videogame developer's central document server);

In a second step s720, assembling a sequence of textures, by

In a first sub-step s722, selecting a first texture for the sequence of textures from the plurality of textures (i.e. choosing an initial texture) and then, one or more times, In a second sub-step s724, adding to the sequence of textures a texture from the plurality of textures that is calculated to be the one most similar to the current last texture in the sequence of textures ('last' optionally referring to either end of the sequence); and In a third step s730, encoding the assembled sequence of textures using a motion vector based video encoding scheme.

In an instance of the summary embodiment, then as described previously herein, the most similar texture is calculated, for each of a plurality of candidate textures, by performing a texture encoding of some or all of the sequence of textures, including a candidate texture, using the motion vector based video encoding scheme such as MPEG 2 or 4, and selecting as the most similar texture the candidate texture that resulted in the lowest prediction error when encoded (i.e. when predicted by the current last texture in the sequence, the error between the predicted version of the candidate texture and the actual candidate texture was the smallest). Because the difference between the prediction and the actual texture is encoded by the MPEG scheme, this also results in the most efficient encoding. As noted previously, the plurality of candidate textures may be limited to a subset of ±P neighbouring textures in a pre-sorted set.

Optionally in this instance of the summary embodiment, then as described previously herein, the texture encoding also comprises a further step of performing a block truncation coding, such as DXT coding, on the textures.

In another instance of the summary embodiment, then as described previously herein, the most similar texture is calculated, for each of a plurality of candidate textures, by performing a cross correlation with the current last texture in the sequence of textures and selecting as the most similar texture the candidate texture that resulted in the highest cross correlation. As noted previously, the plurality of candidate textures may be limited to a subset of ±M neighbouring textures in a pre-sorted set.

In another instance of the summary embodiment, then as described previously herein, the most similar texture is calculated, for each of a plurality of candidate textures, by averaging the colour of respective sub-regions of each candidate texture, averaging the colour of corresponding respective sub-regions of the current last texture in the sequence of textures, calculating the overall difference between the corresponding averages of each candidate texture and the current last texture in the sequence of textures, and selecting as the most similar texture the candidate texture that resulted in the smallest overall difference. As noted previously, the plurality of candidate textures may be limited to a subset of ±N neighbouring textures in a pre-sorted set.

In another instance of the summary embodiment, then as described previously herein, the most similar texture is calculated, for the plurality of textures, by averaging the colour of each texture, arranging each of the textures in an order corresponding to their relative position on a spectrum, and selecting as the most similar texture the candidate texture adjacent in that order to the current last texture in the sequence of textures.

In an instance of the summary embodiment, then as described previously herein, the obtained plurality of textures are each subdivided onto smaller textures of equal size, and used as a replacement plurality of textures.

In an instance of the summary embodiment, then as described previously herein, the assembled sequence of textures is treated as a sub-sequence (for example, an assembled sequence of three, or a further assembled sequence of nine, and so forth). The method then comprises the steps of obtaining a plurality of sub-sequences (i.e. from the previously described method); and assembling a sequence of sub-sequences by selecting a first sub-sequence of the sequence of sub-sequences and then, one or more times, adding to the sequence of sub-sequences a sub-sequence from the plurality of sub-sequences that is calculated to have a first texture that is the one most similar to the current last texture in the sequence of sub-sequences (i.e. evaluate the corresponding end-points of sequences for similarity), and encoding the assembled sequence of textures using a motion vector based video encoding scheme. Here, the assembled sequence of textures is found within the assembled sequence of sub-sequences.

In an instance of the summary embodiment, encoding the assembled sequence of textures comprises identifying breaks in the sequence equal to a number of parallel decoder processing units, or a multiple thereof. These breaks may take the form of intra-coded textures (I-frames), or textures which cause a high prediction error when predicted by the preceding texture in the sequence.

Figure 8:
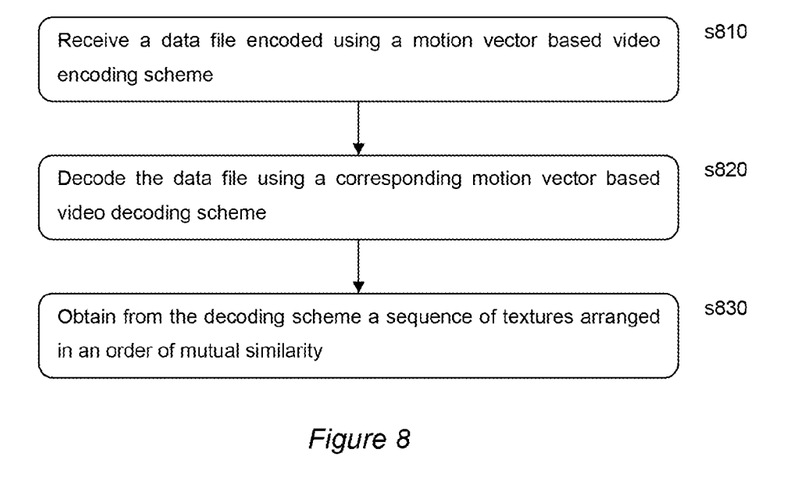
FIG. 8 is a flow diagram of a method of texture decoding in accordance with an embodiment of the present invention.

In a summary embodiment of the present invention, and referring to FIG. 8, a method of texture decoding comprises:
In a first step s810, receiving a data file encoded using a motion vector based video encoding scheme (e.g. an MPEG stream from a disk or network);
In a second step s820, decoding the data file using a corresponding motion vector based video decoding scheme; and
In a third step s830, obtaining from the decoding scheme a sequence of textures arranged in an order of mutual similarity (i.e. in an order where the most similar textures available during the sorting process were placed adjacent each other using one or more of the sequence approximation methods described herein).

Figure 9:
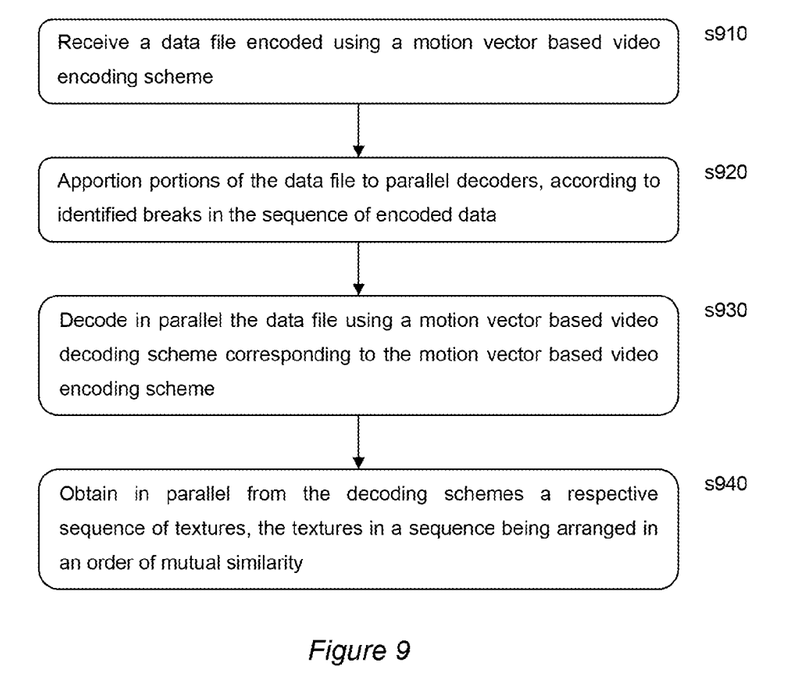
FIG. 9 is a flow diagram of a method of texture decoding in accordance with an embodiment of the present invention.

In a summary embodiment of the present invention, and referring to FIG. 9, a method of texture decoding comprises:
In a first step s910, receiving a data file encoded using a motion vector based video encoding scheme;
In a second step s920, apportioning portions of the data file to parallel decoders, according to identified breaks in the sequence of encoded data within the data file;
In a third step s930, decoding in parallel the data file using a motion vector based video decoding scheme corresponding to the motion vector based video encoding scheme; and
In a fourth step s940, obtaining in parallel from the decoding schemes a respective sequence of textures, the textures in a sequence being arranged in an order of mutual similarity.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, Flash® memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

Hence in a summary embodiment of the present invention, an encoding apparatus 1000, such as a PC or a videogame console developer kit, comprises a storage means (1002) (RAM, HDD, etc) arranged in operation to store a plurality of textures, an assembly processing means (1004) (e.g. a processor or processors operating under suitable software instruction) arranged in operation to assembling a sequence of textures, the assembly processing means being operable to select a first texture of the sequence of textures and then, one or more times, to add to the sequence of textures a texture from the plurality of textures that is calculated to be the one most similar to the current last texture in the sequence of textures, and encoding means (1006) (either a processor or processors operating under suitable software instruction, or dedicated encoding hardware, or a combination of both) arranged in operation to encode the assembled sequence of textures using a motion vector based video encoding scheme.

Meanwhile, in a summary embodiment of the present invention, a decoding apparatus 10A comprises storage means 1002 (RAM, Flash®, HDD etc) arranged in operation to store a data file encoded using a motion vector based video encoding scheme, decoding means 12A comprising a hardware implementation of the corresponding motion vector based video decoding scheme, and storage means (RAM, video RAM etc) arranged in operation to store a sequence of textures output from the decoder in an order of mutual similarity.

In a summary embodiment of the present invention, a decoding apparatus 10 comprises storage means (RAM, Flash®, HDD etc) arranged in operation to store a data file encoded using a motion vector based video encoding scheme, a plurality of parallel decoders (e.g. parallel compute units of a GPU) arranged in operation to use a motion vector based video decoding scheme corresponding to the motion vector based video encoding scheme, apportioning processor means (for example a CPU or CPU core) arranged in operation to apportion portions of the data file to parallel decoders, according to identified breaks in the sequence of encoded data within the data file, and collation processing means (for example a CPU or CPU core) operable to collate respective sequences of textures received from the parallel decoders, the textures in each sequence being output from the respective decoder in an order of mutual similarity.

Finally, in a summary embodiment of the present invention, a non-transitory computer-readable storage medium comprises a data file encoded using a motion vector based video encoding scheme, the data file comprising an encoded sequences of textures arranged in an order of mutual similarity.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of texture encoding, comprising the steps of:
obtaining a plurality of textures of a videogame for application to geometric surfaces in the videogame;
subdividing the obtained plurality of textures onto smaller textures of equal size, and using the smaller textures as a replacement plurality of textures;
assembling, by at least one processor, a sequence of the replacement plurality of textures, by:
selecting a first texture for the sequence of textures from the plurality of textures and then, one or more times,
adding to the sequence of textures a texture from the plurality of textures that is calculated to be most similar to a current last texture in the sequence of textures; and
encoding, by the at least one processor, the assembled sequence of textures using a motion vector based video encoding scheme.

2. The method of texture encoding according to claim 1, in which the most similar texture is calculated by the steps of:
for each of a plurality of candidate textures,
performing a texture encoding of some or all of the sequence of textures, including a candidate texture, using the motion vector based video encoding scheme; and
selecting as the most similar texture the candidate texture that resulted in the lowest prediction error for that candidate texture when encoded.

3. The method of texture encoding according to claim 2, in which the step of performing a texture encoding comprises a further step of performing block truncation coding on the textures.

4. The method of texture encoding according to claim 1, in which the most similar texture is calculated by the steps of:
for each of a plurality of candidate textures,
performing a cross correlation with the current last texture in the sequence of textures; and
selecting as the most similar texture the candidate texture that resulted in the highest cross correlation.

5. The method of texture encoding according to claim 1, in which the most similar texture is calculated by the steps of:
for each a plurality of candidate textures,
averaging a colour of respective sub-regions of each candidate texture,
averaging a colour of corresponding respective sub-regions of the current last texture in the sequence of textures,
calculating an overall difference between corresponding averages of each candidate texture and the current last texture in the sequence of textures; and
selecting as the most similar texture the candidate texture that resulted in a smallest overall difference.

6. The method of texture encoding according to claim 1, in which the most similar texture is calculated by the steps of:
for the plurality of textures,
averaging a colour of each texture;
arranging each of the textures in an order corresponding to their relative position on a spectrum; and
selecting as the most similar texture the candidate texture adjacent in that order to the current last texture in the sequence of textures.

7. The method of texture encoding according to claim 1, in which the assembled sequence of textures is treated as a sub-sequence, the method comprising the steps of:
obtaining a plurality of sub-sequences; and
assembling a sequence of sub-sequences, by
selecting a first sub-sequence of the sequence of sub-sequences and then, one or more times, and
adding to the sequence of sub-sequences a sub-sequence from the plurality of sub-sequences that is calculated to have a first texture that is most similar to the current last texture in the sequence of sub-sequences.

8. The method of texture encoding according to claim 1, in which the step of encoding the assembled sequence of textures comprises identifying breaks in the sequence equal to a number of parallel decoder processing units, or a multiple thereof.

9. A method of texture decoding, comprising the steps of:
receiving a data file encoded using a motion vector based video encoding scheme;
decoding, by at least one processor, the data file using a corresponding motion vector based video decoding scheme;
obtaining, by the at least one processor from the decoding scheme, a sequence of textures of equal size subdivided from a plurality of textures, arranged in an order of mutual similarity;
reassembling the subdivided textures to form textures; and
applying one or more of the textures to geometric surfaces in a videogame.

10. A method of texture decoding according to claim 9, in which the step of decoding comprises:
apportioning portions of the data file to parallel decoders, according to identified breaks in the sequence of encoded data within the data file;
decoding in parallel the data file using a motion vector based video decoding scheme corresponding to the motion vector based video encoding scheme;
and in which the step of obtaining comprises:
obtaining in parallel from the decoding schemes a respective sequence of textures, the textures in a sequence being arranged in an order of mutual similarity.

11. A non-transitory computer program product comprising a computer readable medium storing computer program code thereon, the computer program code, when executed by a processor, causing the processor to perform a method of texture decoding comprising the steps of:
receiving a data file encoded using a motion vector based video encoding scheme;
decoding the data file using a corresponding motion vector based video decoding scheme;
obtaining from the decoding scheme a sequence of textures of equal size subdivided from a plurality of textures, arranged in an order of mutual similarity;
reassembling the subdivided textures to form textures; and
applying one or more of the textures to geometric surfaces in a videogame.

12. An encoding apparatus, comprising:
storage means arranged in operation to store a plurality of textures of a videogame for application to geometric surfaces in the videogame;

processing means for subdividing the stored plurality of textures onto smaller textures of equal size, and using the smaller textures as a replacement plurality of textures;

assembly processing means arranged in operation to assemble a sequence of the replacement plurality of textures, the assembly processing means being operable to select a first texture of the sequence of textures and then, one or more times, to add to the sequence of textures a texture from the plurality of textures that is calculated to be most similar to a current last texture in the sequence of textures; and encoding means arranged in operation to encode the assembled sequence of textures using a motion vector based video encoding scheme.

13. A decoding apparatus, comprising:

first storage means for storing a data file encoded using a motion vector based video encoding scheme;

a decoder comprising a hardware implementation of a corresponding motion vector based video decoding scheme configured to decode the data file using the corresponding motion vector based video decoding scheme and to obtain a sequence of textures of equal size subdivided from a plurality of textures;

second storage means for storing the sequence of textures obtained from the decoder in an order of mutual similarity;

processing means for reassembling the subdivided textures to form textures; and processing means for applying one or more of the textures to geometric surfaces in a videogame.

14. A decoding apparatus according to claim 13, in which the decoder comprises:

a plurality of parallel decoders arranged in operation to use a motion vector based video decoding scheme corresponding to the motion vector based video encoding scheme;

and the decoding apparatus further comprises:

apportioning processor means for apportioning portions of the data file to parallel decoders, according to identified breaks in the sequence of encoded data within the data file; and collation processing means for collating respective sequences of textures received from the parallel decoders, the textures in each sequence being output from the respective decoder in an order of mutual similarity.

* * * * *